Sept. 27, 1966 H. O. CORBETT 3,275,039
SEAMLESS EXTRUDED THERMOPLASTIC SELF-SUSTAINING
LAY-FLAT CONTINUOUS TUBE
Filed Oct. 10, 1961 4 Sheets-Sheet 1

HERBERT O. CORBETT
*INVENTOR.*

BY *E. J. Berry*

Sept. 27, 1966    H. O. CORBETT    3,275,039
SEAMLESS EXTRUDED THERMOPLASTIC SELF-SUSTAINING
LAY-FLAT CONTINUOUS TUBE
Filed Oct. 10, 1961    4 Sheets-Sheet 2

HERBERT O. CORBETT
INVENTOR.

BY E. J. Berry

FIG.3

HERBERT O. CORBETT
INVENTOR.

BY E. J. Berry

HERBERT O. CORBETT
INVENTOR.

BY E. J. Berry

United States Patent Office 3,275,039
Patented Sept. 27, 1966

3,275,039
SEAMLESS EXTRUDED THERMOPLASTIC SELF-SUSTAINING LAY-FLAT CONTINUOUS TUBE
Herbert O. Corbett, Canandaigua, N.Y., assignor to National Distillers and Chemical Corporation, New York, N.Y., a corporation of Virginia
Filed Oct. 10, 1961, Ser. No. 144,253
2 Claims. (Cl. 138—148)

The present invention relates to a method and apparatus for forming tubular films of thermoplastic materials, and particularly to such method and apparatus wherein the tubular film is formed in a substantially lay-flat condition, as compared with the conventional cylindrical form of methods and apparatus of the prior art. The invention especially relates to a method and apparatus wherein a thermoplastic material is extruded from a generally rectangular die comprising a pair of longitudinally opposed die lips, spaced from and separated from each other by an intervening die lip element adapted to introduce a stream of a gaseous material internally of the film tube whereby to cool, separate, and set the extruded film layers.

In the prior art, tubular film forms have been extruded by means of a circular die. Because of the film form produced, difficulty has been experienced in controlling the diameter of the finished product. Also, and by reason of the circular form of the die and film product, adequate external cooling means primarily have been limited to the use of circularly formed means for discharge of gaseous cooling materials. Cooling and setting of the formed film by means of liquid cooled metal surfaces, as employed in the forming of sheet extruded thermoplastics, has been denied to the production of tubular films, by reason of the necessity to maintain a cylindrical form of the film in the immediate vicinity of the circular extrusion die in order to avoid distortion and rupture of the incompletely set molten film material.

It is an object of the present invention to provide a method and apparatus for the production of a tubular film web from thermoplastic materials wherein the web is extruded as two spaced web layers integrally united along opposite longitudinal edge portions during the extrusion operation. It is also an object of the present invention to provide a method and apparatus whereby the internally opposed surfaces of the lay-flat web layers formed in the manner disclosed may be cooled by an air stream introduced between them, and simultaneously held in a spaced apart relationship while the layered film web is cooled and set. It is a further object of the invention to provide a method and means for extruding and forming a lay-flat tubular film web of the character disclosed, wherein the web as formed may be maintained in substantially continuous surface contact with metallic chill rolls during any desired period, whereby to quench and set the film. Still further objects of the present invention are to provide a die structure particularly adapted to the method contemplated, and a chill roll structure cooperatively related to said die structure, and adapted for indirect heat exchange quenching of the tubular film web formed by such a die structure.

The invention and its objects may be more fully understood from the following description, especially when read with reference to the accompanying drawings, of which:

FIG. 3 is a vertical section through the extruder head taken along the line III—III of FIG. 2.

Figure 6:
Figure 7:

FIGURE 6 is a transverse sectional view through an extruded seamless lay-flat tube of thermoplastic film in accordance with the present invention and where one of the flat sheet portions thereof is of a gauge greater than that of the other; and FIGURE 7 is a transverse sectional view through an extruded seamless lay-flat tube of thermoplastic film in accordance with the present invention and where the edge bead portions thereof are of a gauge substantially greater than that of either of the flat sheet portions.

Figure 1:
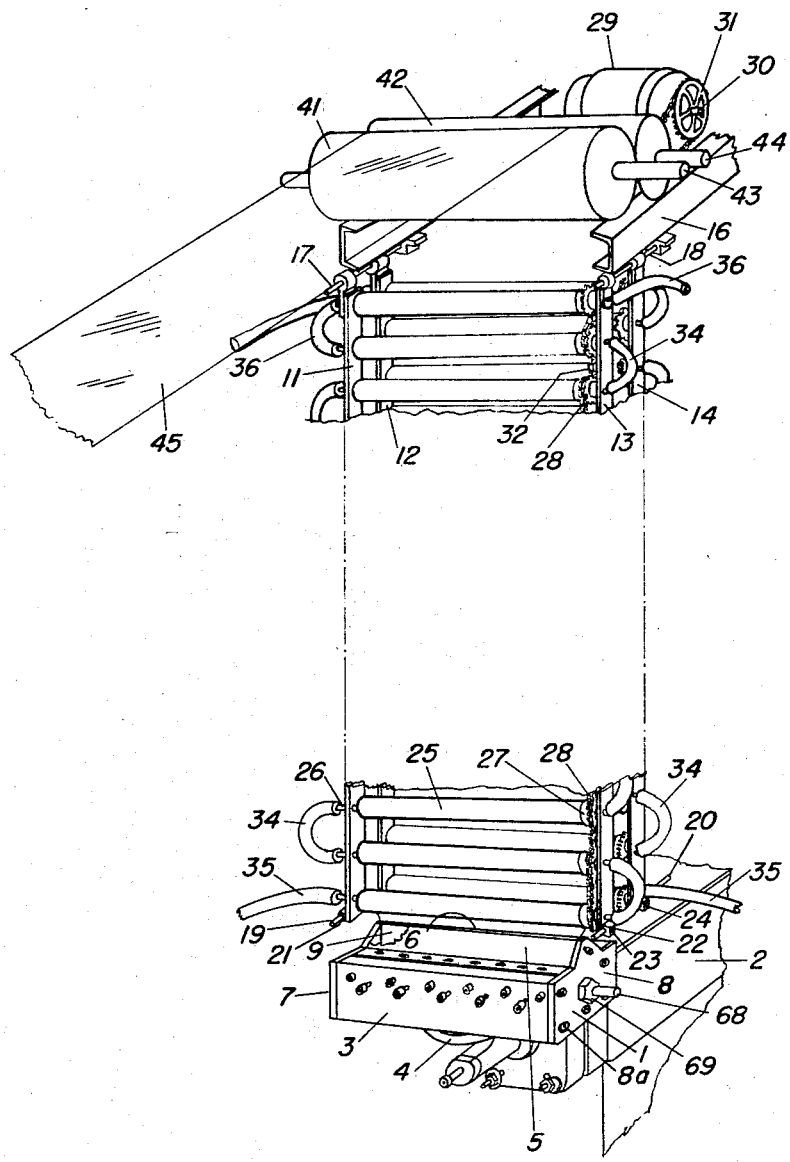
FIG. 1 is a fragmentary view in perspective of an extrusion system according to the present invention, with parts broken away to show internal elements and/or parts otherwise concealed from view.
Figure 2:
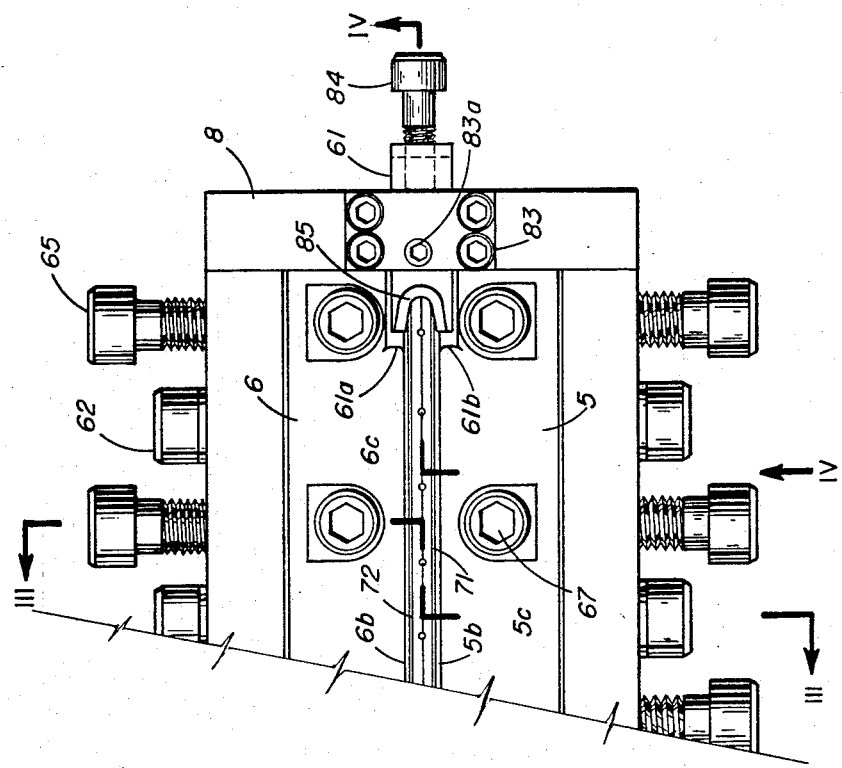
FIG. 2 is a fragmentary plan view of the extruded head illustrated in FIG. 1 with a part of one end broken away substantially as in FIG. 1.
Figure 2:
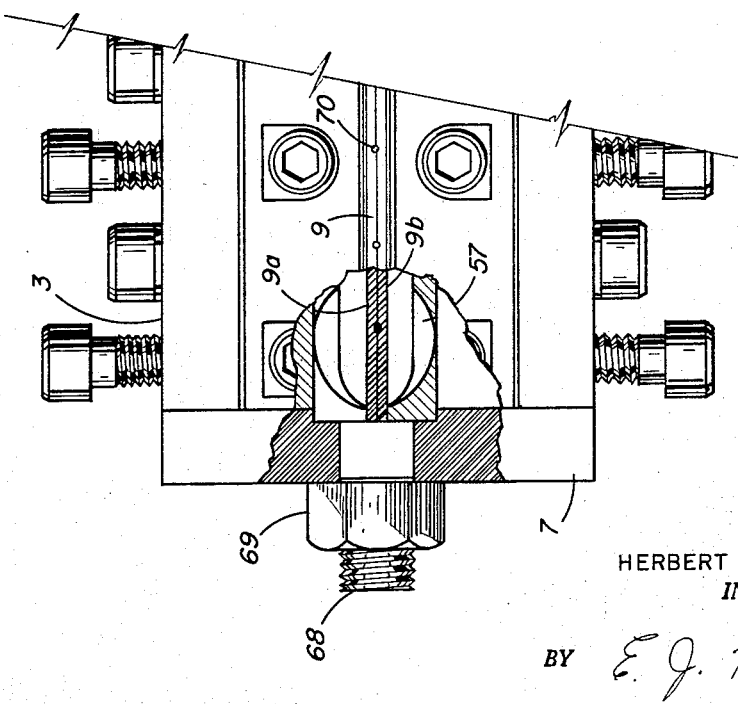

Referring now to the several drawings, wherein like parts are uniformly designated by the same numerals, the assembled extrusion system is shown in FIG. 1. This system generally comprises an extruder head 1 mounted on an extruder barrel 2 so as to direct the die orifice upwardly.

Immediately above the die head is a roller frame structure which includes two pairs of vertical side rail members designated in pairs by the numerals 11 and 13, and 12 and 14 respectively. These side rails are supported by and suspended from a spaced pair of support beams 15 and 16, as by means of hanger rods 17 and 18. The rod 17 provides support for the side rails 11 and 12, and the rod 18 for the rails 13 and 14. Preferably, the rails in opposite relation are supported for selective movement longitudinally of the hanger rods, whereby to provide for adjusted spacing of the rail pairs. To maintain the roller frames fixed in any selected spacing relationship, the lower ends of opposite rail members are connected by rods 19 and 20 passed through collars indicated at 21 and 22 to be held therein as by means of set screws indicated at 23 and 24.

Each pair of rails is adapted to support a series of parallel hollow metal rollers 25 supported transversely between the rails on hollow shafts 26 extended outwardly through suitable bearings in the rails. Each such shaft carries a sprocket 27 fixed to the shaft sprocket, as shown, is disposed intermediate the roller and the inner face of an adjoining rail. These sprockets, and thereby the rollers, are driven by means of a sprocket chain 28, and a motor 29 mounted on the beam 16. The motor shaft 30 mounts a drive sprocket 31 engaged by the chain 28.

As shown, in order to obtain uniform rotation of the rollers in an upward direction the shaft sprockets in one series are engaged by the chain over their outer aspects, while in the other series of shaft sprockets the chain engages them over their inner aspects. Also, in order to maintain engagement between chain and sprockets, idler sprockets, designated by the numberal 32, are mounted on the rails 13 and 14 at several points intermediate pairs of roller shaft sprockets in the manner shown. An idler roll 33 or rollers at the lower ends of the side rails 12 and 14, provide for passing the chain 28 from one roller frame to the other.

Each series of rollers supported between the respective pairs of rail members, is connected through their hollow shafts by means such as conduits 34, whereby to provide for circulation of a heat exchange fluid through the roller series upwardly from the lowermost roller to the uppermost. An inlet conduit 35 provides for introduction of the heat exchange fluid into the lowermost roller, while an outlet conduit 36 provides for discharge of the fluid from the uppermost roller.

The roller frame structure illustrated and described with reference to FIGURE 1, is representative of a mechanical system for accomplishment of the method contemplated according to the present invention. Comparable systems, which include at least two vertical series of horizontal, fluid cooled chill rolls, disposed in opposed spaced relation substantially to define an elongated, relatively narrow travel path between the rolls for a tube-type, thermoplastic film web extruded and drawn along said path in outer surface contact with said rolls also may be employed. The arrangement illustrated, wherein said vertical rail frame members supporting the horizontal rolls are hinge supported at their upper ends, may be modified to provide other means for variably spacing the frame members. Also other roll drive means, including gear and belt drive means may be provided without departing from the inventive concepts set forth.

The numerals 41 and 42 designate a pair of nip rolls disposed immediately above and in transverse relation to the beams 15 and 16. The rolls 41 and 42 may be supported on the beams by bearing brackets (not shown) adapted to receive the roll shafts 43 and 44 respectively. The roll 41 and shaft 43 preferably are hollow metal elements adapted for circulation of a heat exchange fluid therethrough. The roll 42 preferably is coated or covered with a resilient material such as rubber, neoprene, or another material having a relatively high coefficient of friction relative to the thermoplastic material worked on.

These nip rolls 41 and 42 are well known in the art, and are intended to be driven, in the direction indicated by arrows, in any conventional fashion. In the structure illustrated, however, it is desired that they be mounted so that a line of relative tangency between the rolls be located in a vertical plane common to the longitudinal center line of the die orifice opening from the head 1. As illustrated in FIG. 1, the sheeted thermoplastic material, designated by the numeral 45, is extruded substantially along this plane and line to pass upwardly between the roller frames into engagement by the nip rolls.

The extruder had structure 1, as shown in the several drawings, is generally composed of a body portion 3; an inlet nozzle 4; die lips 5 and 6; end cap plates 7 and 8; and an air blade 9.

Figure 4:
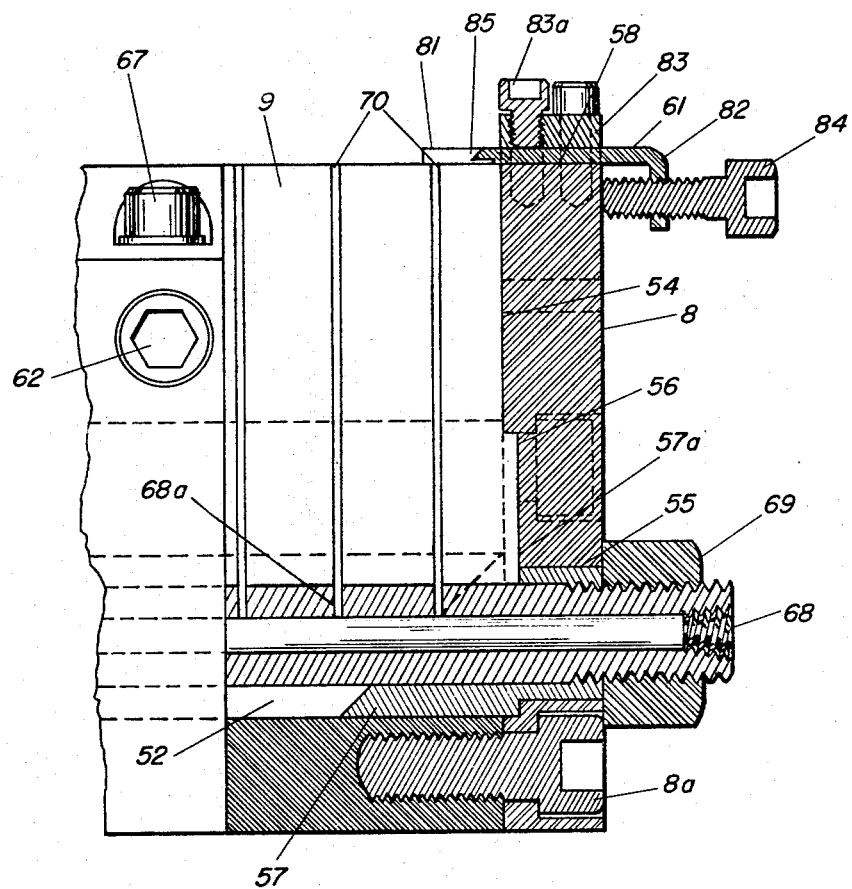
FIG. 4 is a vertical section through the extruder head, taken along the line IV—IV of FIG. 2, with parts in elevation.
Figure 5:
FIGURE 5 is a transverse sectional view through an extruded seamless lay-flat tube of thermoplastic film, of uniform gauge, in accordance with the present invention.

In this structure, the body portion 3 and nozzle 4 cooperatively define an elongated inlet conduit 51 opening through the under side of the body into a generally cylindrical passageway 52 defined longitudinally of the body portion. The upper side of the body portion defines a recess 53 coextensive with the passageway 52, and centered on a line parallel to the passageway longitudinal axis, with both line and axis lying in a common vertical plane. A vertical slotted portion 54 is defined in the body to communicate between the passageway and the recess, coextensively therewith on a radius of the passageway lying in the aforementioned plane. Each of the passageway, and the recess and slotted portions opens through the oposite ends of the body portion, but are normally closed by means of the cap plates 7 and 8, secured to the body portions ends as by means of cap screw bolts 8a particularly shown in FIG. 4.

Each cap plate 7 and 8 is provided to define a passageway 55 between inner and outer face portions, and a recess 56 in the inner face which extends radially upward from the inner end of the passageway 55 to the upper end of the plate. Also, as particularly shown in FIG. 4 the passageway 55 in each cap plate is extended from the inner face of the plate by means of a nipple 57. The nipple is fixedly secured in the passageway 55 at one end, as by welding. The other end, which extends beyond the plate face is cut at an angle so as to slope toward the plate in a plane common to a line along the plate surface intersecting the recess 56 in right angular relation thereto. In addition, the nipple is cut to provide a slotted portion 57a aligned with and opening into the recess 56 at its juncture with the passageway 55. The upper end, of each cap plate is notched to provide a recess 58 adapted to receive a deckle plate element 61.

The die lips, 5 and 6, are similar in that each is an elongated element provided for insertion in the body portion recess 53 to be coextensive therewith. Each die lip has a bottom surface fitted to the bottom of the recess, and opposite vertical wall portions of which the outer wall portions 5a and 6a have a height substantially equal to the depth of the recess 53, while the inner wall portions 5b and 6b are of a greater dimension, with the upper surfaces 5c and 6c angled upward therebetween. Each die lip has a thickness, or lateral dimension at its bottom surface which is appreciably less than half the width of the recess 53 and narrower than the distance between the edges of the slotted portion 54 and the inner wall surfaces of the recess 53. At each end, each die lip is provided with flattened surface portions, such as designated by numerals 61a and 61b. These portions are substantially right triangular in cross section, being integral with the upper angular surface portions 5c and 6c respectively of the die lips 5 and 6, with the hypotenuse of the triangular sections based on the surface portions 5c and 6c. The flat upper surfaces of the portions 61a and 61b and the bottoms of the recesses 58 are designed to lie in the same plane when the plates are affixed to the body portion ends.

Figure 3:
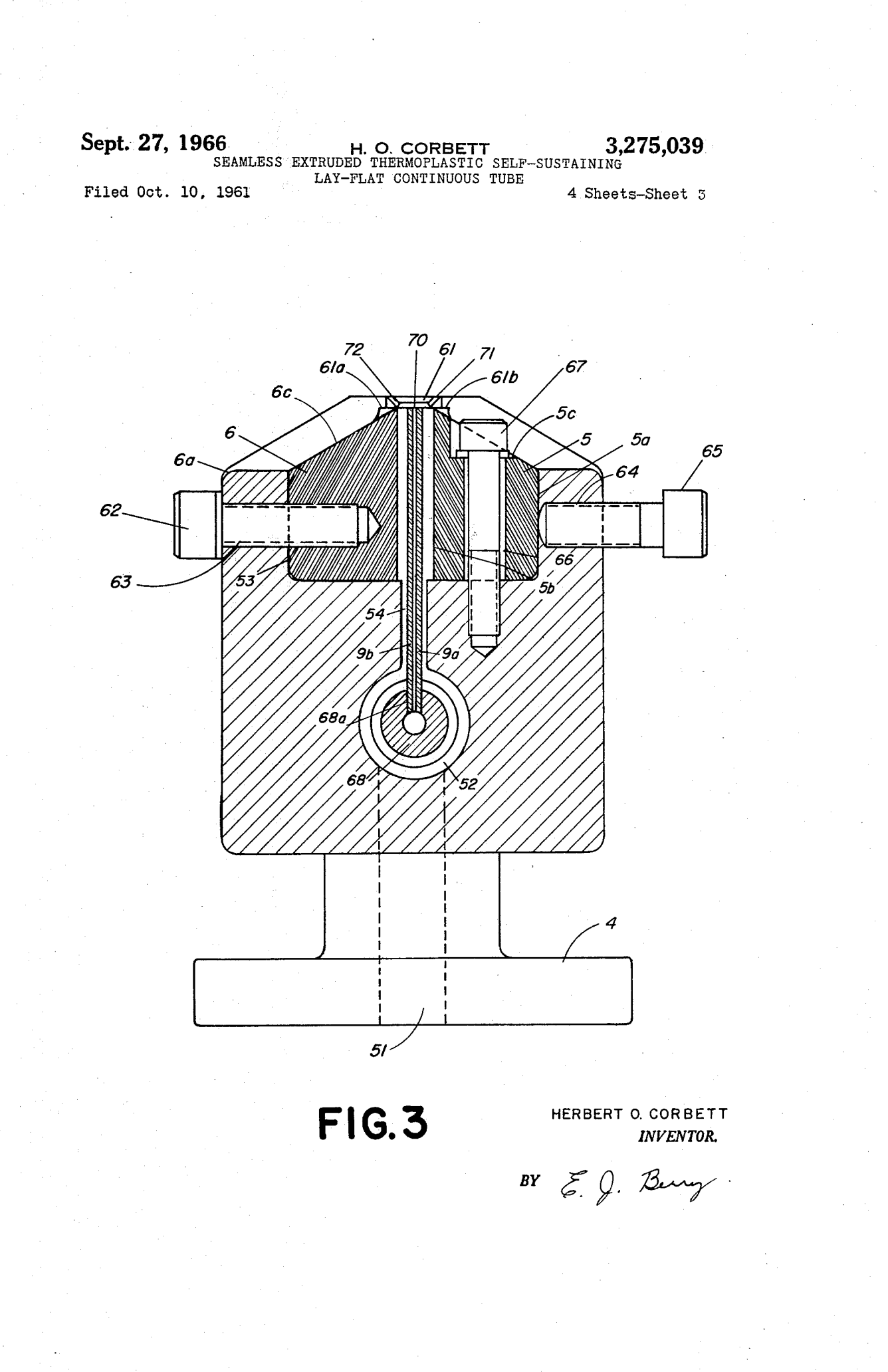

As particularly shown in FIGS. 3; the outer wall portions 5a and 6a of the respective die lips are drilled at spaced intervals and internally threaded to receive "puller bolts" 62 which are passed through drilled, but unthreaded passageways 63 in the upstanding wall portions of the recess 53. In addition, these wall portions are drilled and threaded to form passageways 64 adapted to receive threaded pusher bolts 65. In the arrangement contemplated these puller and pusher bolts are intended to form an alternating series along each of the wall portions 5a and 6a, whereby the inner wall portions 5b and 6b of the die lips may be individually located with reference to an adjoining edge of the slotted portion 54. In the assembly as illustrated, the inner wall portions of the die provide a variable width extension of the slotted portion 54 in the body portion 3.

Each die lip is also drilled at spaced intervals along its length to provide a series of unthreaded passageways 66 adapted to pass a corresponding series of hold-down bolts or cap screws 67 into threaded engagement with corresponding recesses drilled and threaded in the extruder head body portion 3. The passageways 66 are ovalized on longitudinal axes parallel to the axes of the passageways 63 and 64.

The air blade 9 comprises a pair of flat plate elements, 9a and 9b, of substantially equal thickness having inner and outer surfaces, wherein the inner surfaces have been milled to form a series of transverse semicircular grooves at regular and equally spaced intervals from end to end whereby, when the two plates, are joined with their inner surfaces in sealed juxtaposition, the grooves are paired to form substantially cylindrical passageways 70 through the blade 9 from edge to edge and aligned longitudinally of the blade. The length of the plate elements is determined by the distance bottom surfaces of the recesses 56 when the cap plates 7 and 8 are secured to the respective ends of the body portion 3.

In the complete blade, the plates 9a and 9b, joined are combined with a hollow cylindrical conduit element 68 by sealed insertion in a radial slot 68a extending therein for a distance intermediate its ends which is substantially equal to that of the lower longitudinal edge portions of the blade plates. Overall, the conduit element 68 has a longitudinal dimension greater than that of the extruder head at the outer surfaces of the cap plates 7 and 8, the ends being threaded to receive nuts such as indicated by the numeral 69 in FIG. 4 with one or both of these ends being adapted for connection to a source of a chilled fluid. The element 68 has an outside diameter substantially less than that of the passageway 52.

In the extruder head assembly shown by the drawings, the air blade 9 is disposed with the conduit element 68 extended through the passageway 52 so as to extend beyond the ends of the head body portion at each end, and outwardly through the respective cap plates 7 and 8, at each end by way of the nipples 57. As thus disposed, the lower longitudinal edge portion of the blade is engaged in the nipple slots 57a and the plate recesses 56. Also, the united blade plate portions extend radially upward through the slotted portion 54 and the space between the opposed inner wall surfaces 5b and 6b of the die lips 5 and 6. With the cap plates 7 and 8 secured to the ends of the extruder head body portion, the nuts 69 are applied to the threaded ends of the conduit element 68 whereby rigidly to secure the air blade unit.

In this assembly, the blade 9 is provided to have an overall thickness, from outer to outer surface, substantially less than the slot 54. As thus disposed, the blade 9 extends upwardly through the slot 54, and between the slot extension provided between the inner surfaces 5b and 6b of the die lip members, to the level of the juncture between these surfaces and the flattened surface portions 61a and 61b. Also, as thus disposed, the opposite surfaces of the blade 9 cooperate with the inner surfaces 5b and 6b to form a spaced pair of die orifices, designated by the numerals 71 and 72 which are connected at opposite ends between the upper end edge portions of the blade and the inner surface of the respective cap plates 7 and 8. The width of these orifices, and thereby the gauge of the thermoplastic material extruded on opposite sides of the blade 9 may be adjusted by means of the puller and pusher studs or bolts 62 and 65 respectively.

Inasmuch as it is intended to produce a lay-flat tube comprising spaced opposed sheet films integrally joined along their longitudinal edges, means are provided for controlling the film gauge along these junctures. Suitable means are provided by deckle plates 61. Each of these plates is formed from a piece of a metal bar stock having a thickness at least equal to the depth of the recesses 58, and having an inner end 81 and an outer end 82. Each of the plates is held in the recesses 58 by means of a clamp 83, secured to the respective upper ends of the cap plates by stud bolts as shown, and a set screw such as indicated at 83a.

The outer end 82 of each deckle plate is bent at right angles to the main body thereof, and is drilled and threaded to receive a spacer bolt 84. The inner end of each plate is notched as at 85 to a form wherein the sides of the notch are flared tangentially from a circular base portion having a radius substantially equal to that of the upper ends of the blade 9, the notch being angularly chamfered along its leg and base portions to a line intermediate the upper and lower plate surfaces. Disposed for use in the assembly, the flared sides of the notch extend angularly beyond the end edges of the air blade plate, with the notch base portion cooperating therewith to provide an adjustable continuance of the orifices formed between the die lips and the air blade. The exact disposition of the notch with relation to the air blade may be determined by manipulation of the clamp 83, spacer bolts 84, and set screw 83a.

In an operation according to the method contemplated by the present invention, a molten thermoplastic material is discharged through the extruder barrel 2 into the head 1 by way of the conduit 51, and into the passageway 52. Thence, the flow is divided by the fluid conduit element 68, to pass upwardly around the air blade 9, and outwardly from the continuous orifice formed between the air blade 9, die lips 5 and 6, and the deckle plates 61.

The molten material issuing from the orifice as a continuous lay-flat tube of material is led upwardly between the chill rolls 25 supported above the extruder die head 1, and passed between the nip rolls 41 and 42. A chilled fluid, such as refrigerated air, is introduced through either or both ends of the conduit element 68 to be discharged, by way of the air blade passageways 70, to maintain a pressure within the extruded tube form sufficient to separate the opposed sheets or wall portions of the thermoplastic material and extend them into surface contact with the chill rolls 25.

At this time also, the chill rolls 25 are energized for rotation by means of the motor 29, and the sprocket chain 28, as previously described. Prior to this, the rolls 25 and the nip roll 41 have been chilled by circulation therethrough of a refrigerated liquid, such as water, by way of the respective conduit connections thereto.

In operating according to the method contemplated the layered tube may be produced so as to have a substantially uniform material gauge throughout by adjusting the die lips and deckle plates with reference to the sides and end edges of the air plate to provide a continuous orifice of substantially uniform width. Alternately, one die lip may be spaced from the air blade at a greater distance than the other, whereby to produce a tube form in which one of the two layers of the material has a heavier gauge than the other. Also, by adjustment of the deckle plate elements the edge portions of the lay-flat tube may be gauged in any manner desired.

What is claimed is:

1. As an article of manufacture, a self-sustaining extruded seamless and lay-flat continuous tube of thermoplastic film, said tube comprising a pair of substantially parallel flat sheets of thermoplastic material, said sheets being relatively spaced from each other and joined along their longitudinal edges by substantially semicircular bead portions, at least one of said flat sheets and semicircular bead portions being of a different gauge from that of the remaining portions of said lay-flat tube.

2. An article of manufacture according to claim 1, wherein said bead portions are of a gauge substantially greater than that of either of said flat sheets.

References Cited by the Examiner

UNITED STATES PATENTS

| | | | |
|---|---|---|---|
| 1,488,585 | 4/1924 | Bundy | 138—171 |
| 2,422,725 | 6/1947 | Gilfillan | 138—151 |
| 2,428,127 | 9/1947 | Sidnell | 264—303 X |
| 2,444,059 | 6/1948 | Neher et al. | 154—43 |
| 2,468,585 | 4/1949 | Bluma | 264—177 |
| 2,683,263 | 7/1954 | Lenhart | 264—303 X |
| 2,690,592 | 10/1954 | Schanz | 264—209 X |
| 2,714,744 | 8/1955 | Becker | 18—14 |
| 2,719,100 | 9/1955 | Banigan | 156—218 X |
| 2,720,680 | 10/1955 | Gerow | 264—209 X |
| 2,834,056 | 5/1958 | Miller | 264—303 X |
| 2,916,053 | 12/1959 | Klasing et al. | 138—128 |
| 2,945,739 | 7/1960 | Lehmicke | 264—177 |
| 2,951,004 | 8/1960 | Martin et al. | 156—298 X |
| 2,990,306 | 6/1961 | Dyer | 154—43 |
| 3,018,516 | 1/1962 | Clinefelter | 18—14 |
| 3,104,682 | 9/1963 | Schenk et al. | 138—128 |

FOREIGN PATENTS

| | | |
|---|---|---|
| 1,004,798 | 3/1957 | Germany. |
| 242,970 | 11/1946 | Switzerland. |

LAVERNE D. GEIGER, *Primary Examiner.*

MICHAEL V. BRINDISI, ALEXANDER H. BROADMERKEL, LEWIS J. LENNY, *Examiners.*

R. DOHERTY, H. ARTIS, J. DUNCAN,
*Assistant Examiners.*